United States Patent
Su et al.

(10) Patent No.: US 11,866,092 B1
(45) Date of Patent: Jan. 9, 2024

(54) RAKE ADJUSTMENT ASSEMBLY OF STEERING COLUMN

(71) Applicant: Steering Solutions IP Holding Corporation, Saginaw, MI (US)

(72) Inventors: Super Su, Jiangsu (CN); Shenbing (Assur) Wen, Jiangsu (CN); Donald A. Buzzard, Saginaw, MI (US); Michael P. Anspaugh, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/080,203

(22) Filed: Dec. 13, 2022

(51) Int. Cl.
*B62D 1/187* (2006.01)
*B62D 1/184* (2006.01)

(52) U.S. Cl.
CPC ............. *B62D 1/187* (2013.01); *B62D 1/184* (2013.01)

(58) Field of Classification Search
CPC ................................ B62D 1/184; B62D 1/189
See application file for complete search history.

(56) References Cited

U.S. PATENT DOCUMENTS

| | | | | |
|---|---|---|---|---|
| 5,338,064 A * | 8/1994 | Sadakata | ................ | B62D 1/184 280/775 |
| 5,531,317 A * | 7/1996 | Tomaru | .................. | B62D 1/184 280/775 |
| 5,722,299 A * | 3/1998 | Yamamoto | ............. | B62D 1/184 280/775 |
| 5,934,150 A * | 8/1999 | Srinivas | ................... | F16C 1/223 403/104 |
| 6,092,955 A * | 7/2000 | Chartrain | ............... | B62D 1/184 403/283 |
| 6,092,957 A * | 7/2000 | Fevre | ..................... | F16B 5/0225 403/374.5 |
| 6,390,717 B1 * | 5/2002 | Bar | ........................ | B62D 1/184 403/DIG. 1 |
| 9,073,573 B2 * | 7/2015 | Sugiura | ..................... | B62D 1/18 |
| 9,156,491 B2 * | 10/2015 | Okano | .................... | B62D 1/184 |
| 9,187,115 B2 * | 11/2015 | Kakishita | ............... | B62D 1/187 |
| 9,428,214 B2 * | 8/2016 | Ku | .......................... | B62D 1/184 |
| 9,718,490 B2 * | 8/2017 | Tanaka | .................... | B62D 1/184 |
| 10,196,080 B2 * | 2/2019 | Kim | ....................... | B62D 1/195 |
| 10,640,141 B2 * | 5/2020 | Kwon | .................... | B62D 1/189 |

(Continued)

FOREIGN PATENT DOCUMENTS

CN 107487353 A * 12/2017
CN 112339853 A * 2/2021

(Continued)

*Primary Examiner* — Nicole T Verley
(74) *Attorney, Agent, or Firm* — Dickinson Wright PLLC (57) ABSTRACT

A rake assembly for a steering column includes a pin adapted to move along a first axis between a locked position and an unlocked position, a first tray fixed to a support structure, the first tray including an exterior surface and an extension, at least one set of teeth defined on the exterior surface, the extension extending from an edge of the set of teeth formed in the exterior surface and at least partially along a length of the set of teeth, the extension including an upper surface spaced apart from the exterior surface to define a step, and a rocker tray including an inner surface, at least one set of teeth defined on the inner surface and adapted to mesh with the set of teeth of the first tray when in the locked position and un-mesh when in the unlocked position.

19 Claims, 12 Drawing Sheets

(56) References Cited

U.S. PATENT DOCUMENTS

| | | | | |
|---|---|---|---|---|
| 2008/0231030 A1* | 9/2008 | Menjak | ............... | B62D 1/184 |
| | | | | 280/775 |
| 2012/0125139 A1* | 5/2012 | Tinnin | ............... | B62D 1/184 |
| | | | | 74/493 |
| 2017/0066467 A1* | 3/2017 | Russell | ............... | B62D 1/197 |
| 2018/0141582 A1* | 5/2018 | Bodtker | ............... | B62D 1/195 |
| 2019/0337552 A1* | 11/2019 | Buzzard | ............... | B62D 1/187 |
| 2020/0324802 A1* | 10/2020 | Buzzard | ............... | B62D 1/189 |
| 2021/0276608 A1* | 9/2021 | Dubay | ............... | B62D 1/187 |

FOREIGN PATENT DOCUMENTS

| | | | | |
|---|---|---|---|---|
| DE | 3619125 C1 | * | 10/1987 | |
| DE | 19839496 A1 | * | 3/2000 | |
| DE | 19915341 A1 | * | 10/2000 | |
| DE | 10217534 A1 | * | 11/2003 | |
| DE | 102008007094 A1 | * | 9/2009 | |
| EP | 0167925 A1 | * | 1/1986 | |
| EP | 1500570 A2 | * | 1/2005 | |
| EP | 3666624 A1 | * | 6/2020 | |
| GB | 2352286 A | * | 1/2001 | |
| GB | 2456040 A | * | 7/2009 | |
| GB | 2465179 A | * | 5/2010 | |
| GB | 2521518 A | * | 6/2015 | |
| JP | 2016005930 A | * | 1/2016 | |
| JP | 6350849 B2 | * | 7/2018 | |
| KR | 20160050315 A | * | 5/2016 | |
| WO | WO-2004087483 A2 | * | 10/2004 | |
| WO | WO-2005102818 A1 | * | 11/2005 | |
| WO | WO-2007014408 A1 | * | 2/2007 | |
| WO | WO-2009047516 A1 | * | 4/2009 | ............. B62D 1/184 |
| WO | WO-2019147032 A1 | * | 8/2019 | |

* cited by examiner

RAKE ADJUSTMENT ASSEMBLY OF STEERING COLUMN

BACKGROUND OF THE DISCLOSURE

The present invention relates to steering columns and, more particularly, to a rake adjustment assembly of the steering column.

Rake adjustment assemblies are known to include teeth that mesh together when the rake adjustment assembly is placed in a locked position after the desired rake adjustment is made. If the teeth between elements are not properly aligned while locking, damage to the teeth and/or difficulty in locking the rake adjustment assembly may occur. Misalignment of the teeth additionally leads to noise due to the friction and movement between the teeth, causing additional wear on the teeth.

Accordingly, it is desirable to design a rake adjustment assembly that is more robust, reliable, and has self-aligning teeth.

SUMMARY OF THE INVENTION

According to one aspect of the disclosure, a rake assembly for a steering column includes a pin adapted to move along a first axis between a locked position and an unlocked position, a first tray fixed to a support structure, the first tray including an exterior surface and an extension, at least one set of teeth defined on the exterior surface, the extension extending from an edge of the set of teeth formed in the exterior surface and at least partially along a length of the set of teeth, the extension including an upper surface spaced apart from the exterior surface to define a step, and a rocker tray including an inner surface, at least one set of teeth defined on the inner surface and adapted to mesh with the set of teeth of the first tray when in the locked position and un-mesh when in the unlocked position.

According to another aspect of the disclosure, a rake assembly for a steering column includes a first tray including an exterior surface and an extension, a first set of teeth and a second set of teeth spaced apart from the first set of teeth each defined on the exterior surface, the extension extending from an inner edge of the second set of teeth between the first set of teeth and the second set of teeth and at least partially along a length of the second set of teeth, the extension including an upper surface spaced apart from the exterior surface to define a step, and a rocker tray including an inner surface, a first set of teeth and a second set of teeth defined on the inner surface and adapted to mesh with the first set of teeth and the second set of teeth of the first tray.

According to yet another aspect of the disclosure, a steering column assembly including a jacket pivotable about a rake axis, a pin having a lever operatively coupled to a first end of the pin, the moveable along a first axis between a locked position and an unlocked position, a support structure operatively coupled to the jacket, a first tray fixed to the support structure, the first tray including an exterior surface and an extension, at least one set of teeth defined on the exterior surface, the extension extending from an edge of the set of teeth and at least partially along a length of the set of teeth, the extension including an upper surface spaced apart from the exterior surface to define a step, and a rocker tray including an inner surface, and at least one set of teeth defined on the inner surface and adapted to mesh with the set of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring to FIGS. 1-11, a steering column 20 for a vehicle is depicted. The vehicle may be a passenger vehicle, such as a car, truck, van, or sport utility vehicle (SUV), or any other type of vehicle. For example, it is contemplated and possible that the steering column 20 described herein is applicable to planes, boats, commercial vehicles, or the like.

Figure 1:
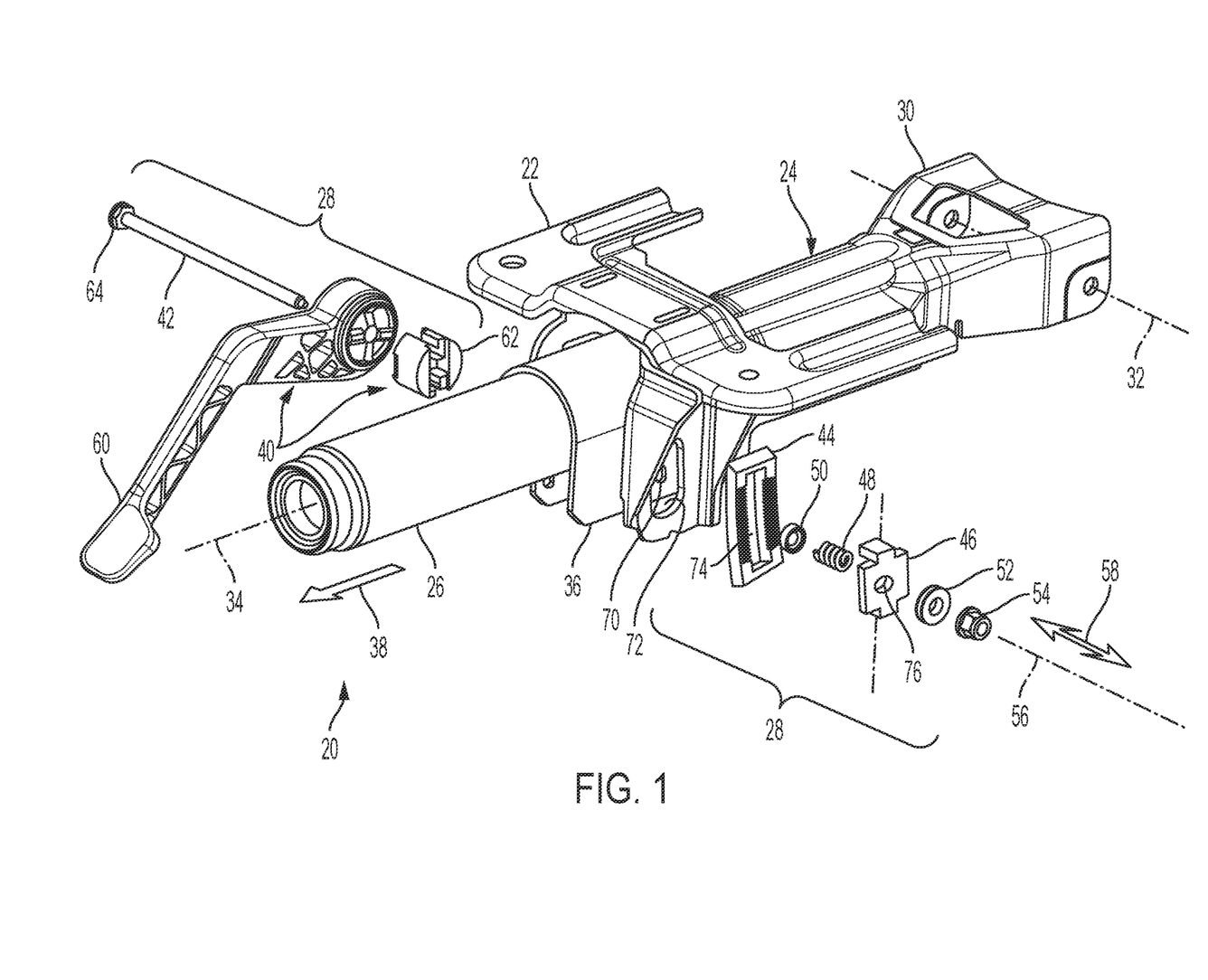
FIG. 1 is an unassembled, perspective view of a steering column having a rake adjustment assembly, according to one or more embodiments shown and described herein.

Referring to FIG. 1, the steering column 20 includes a support structure 22, a lower jacket 24, an upper jacket 26, and a rake adjustment assembly 28. The support structure 22 may be stationary and adapted to rigidly attach to a stationary structure (not shown) of a vehicle, such as a dashboard or frame of the vehicle. In some embodiments, the support structure 22 may be formed with the stationary structure of the vehicle so that the support structure 22 is part of the stationary structure. A forward end portion 30 of the lower jacket 24 is pivotally attached to a stationary structure of the vehicle for pivoting about a pivot axis 32. The stationary structure may be the same or separate from the stationary structure that the support structure 22 is attached to. The upper jacket 26 is telescopically supported by the lower jacket 24 such that both co-extend along a telescopic axis 34 orientated substantially normal to the pivot axis 32. The telescopic axis 34 may be an axis of rotation of which a steering wheel rotates about. The upper jacket 26 axially projects outward from a rearward end portion 36 of the lower jacket 24, and is adapted to axially adjust between retracted and extended positions with respect to the lower jacket 24 for the convenience and/or comfort of a vehicle operator. Although not illustrated, a steering shaft is supported in-part by the upper jacket 26 for rotation about the telescopic axis 34, and projects axially rearward (see arrow 38 in FIG. 1) from the upper jacket 26 for engagement to a steering wheel (not shown).

The telescopic adjustment of the jackets 24, 26 is substantially horizontal and, where the steering column is so configured, generally functions to adjust the steering wheel rearward toward the vehicle operator and forward away from the vehicle operator. The rake adjustment assembly 28 is adapted to adjust the vertical position, or rake position, of the steering wheel by pivoting the jackets 24, 26 about the pivot axis 32. In other words, the rake adjustment adjusts an angular position of the steering wheel and steering column about an axis perpendicular to the telescoping direction and telescoping axis 34. The embodiments disclosed herein may be utilized in a steering column that has telescoping and/or a rake adjustment capabilities.

Figure 2:
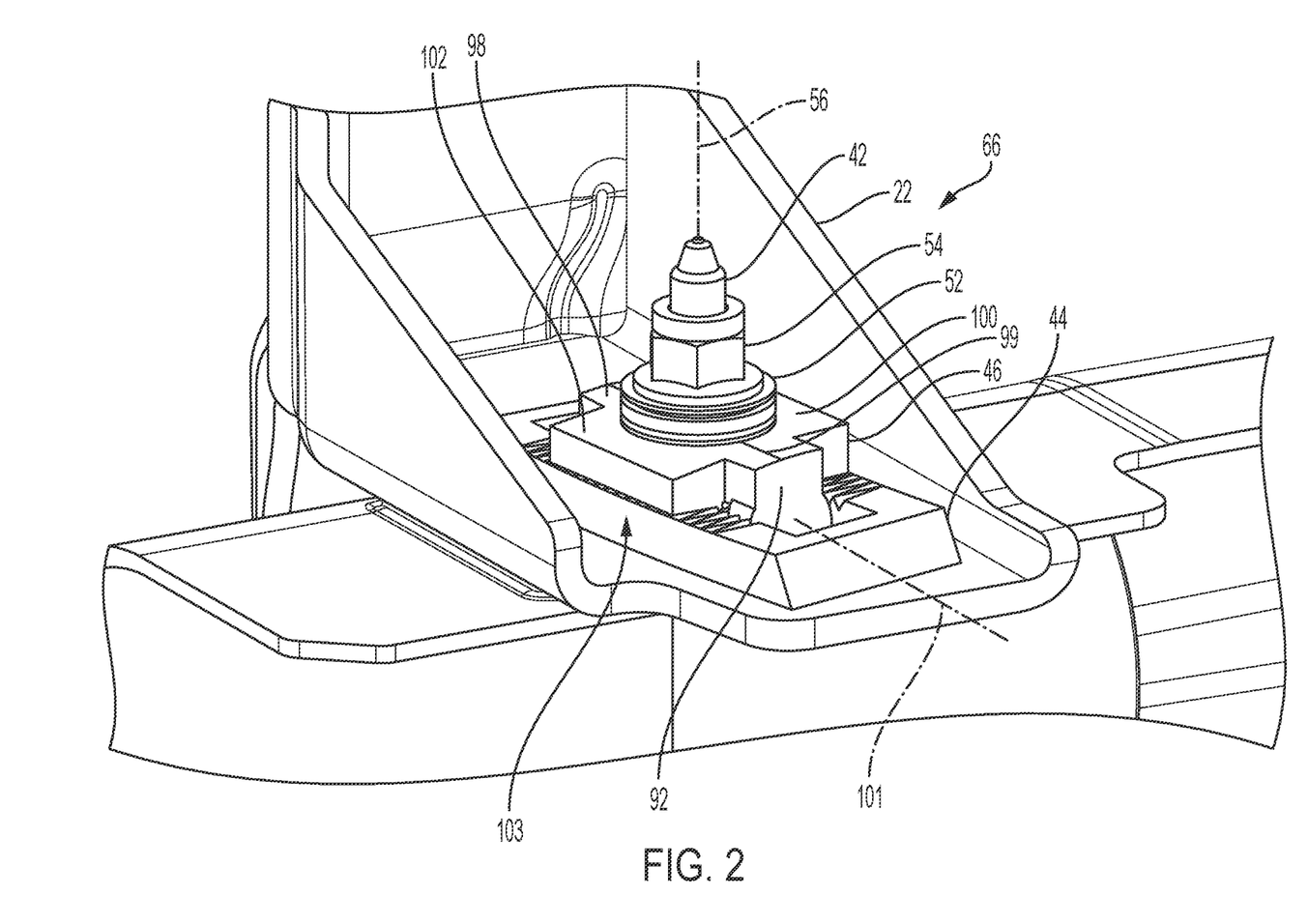
FIG. 2 is a partial, assembled, perspective view of the rake adjustment assembly in a locked position, according to one or more embodiments shown and described herein.
Figure 3:
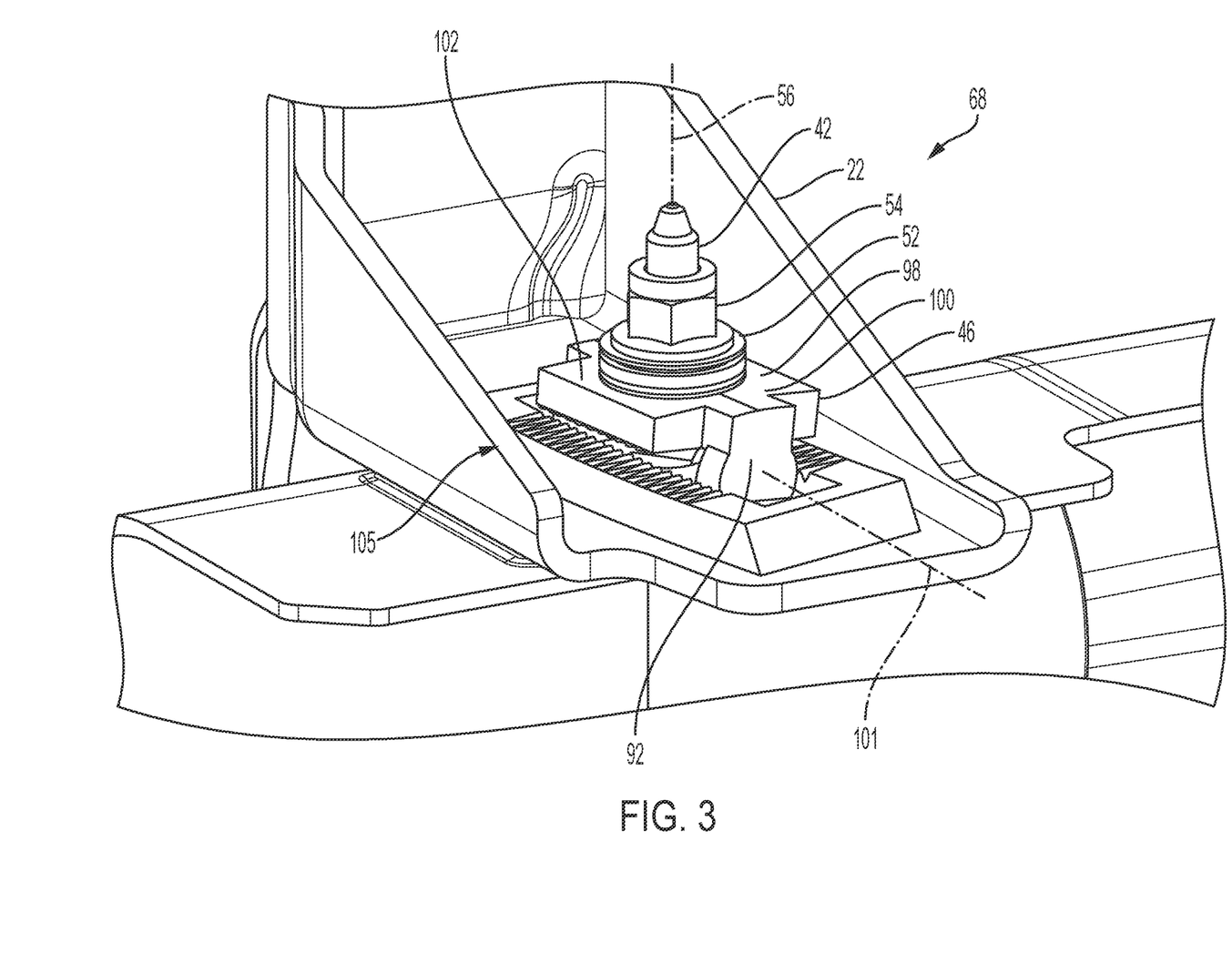
FIG. 3 is a partial, assembled, perspective view of the rake adjustment assembly in an unlocked position, according to one or more embodiments shown and described herein.

Referring to FIGS. 1 and 2, the rake adjustment assembly 28 is generally carried and supported between the support structure 22 and the rearward end portion 36 of the lower jacket 24. The rake adjustment assembly 28 may include a lever device 40, a pin 42 (e.g., bolt), an inner tray 44 that may be fixed to the support structure 22, a rocker tray 46, a resilient biasing member 48 (e.g., an axially compressible spring or a torsion spring), a spring seat element 50, a thrust bearing 52, and a fastener 54 (e.g., threaded nut). However, it is contemplated and possible that the rake adjustment assembly 28 may include more or less components without departing from the scope of the present disclosure, and may be incorporated in any traditional rake adjustment assembly for a steering wheel. In the depicted rake adjustment assembly 28, the lever device 40 is adapted to convert rotational, or rotary, motion about an axis 56 into axial motion with respect to axis 56 (see arrow 58 in FIG. 1). The lever device 40 includes a lever 60 (e.g., manual lever) and cam member 62 that, when the lever 60 is actuated, move the rocker tray 46 away from or towards the inner tray 44. The spring 48 may be adapted to produce an axial force with respect to the axis 56 that biases an enlarged head 64 of the pin 42 (e.g., a hexagonal bolt head) against the lever 60, and biases the rocker tray 46 against the thrust bearing 52, which in-turn is biased against the threaded nut 54 at an opposite end of the pin 42.

During operation, actuation of the lever 60 causes the pin 42 to rotate about axis 56, and a cam interface between the cam member 62 and the lever 60 causes the pin 42 to move axially along the axis 56 as the pin 42 rotates. The rotation of the pin 42 causes the rake adjustment assembly 28 to switch between a locked position 66 (see FIGS. 2, 4, and 6), and an unlocked position 68 (see FIGS. 3, 5, and 7). In one example, the axis 56 is substantially parallel to axis 32, and normal to axis 34. In another embodiment, the lever 60 may be fixed to the pin 42 and, therefore, the enlarged head 64 is not required. In another embodiment, the thrust bearing 52 may not be required, such that the rocker tray 46 is biased directly against the fastener 54.

The pin 42 axially projects through openings 70, 72, 74, 76 in the respective end portion 36 of the lower jacket 24, the support structure 22, the inner tray 44, and rocker tray 46 (see FIG. 1). The pin 42 is adapted to move through the openings 70, 72, 74, 76 with respect to the lower jacket 24, the support structure 22, the inner tray 44 and the rocker tray 46. The opening 70 may be a round hole having a radius substantially equal to a radius of the pin 42. The openings 72, 74 may be elongated generally in a vertical direction (i.e., the direction of rake motion), and the opening 76 may be elongated in an axial direction with respect to axis 34 to facilitate a rocking motion of the rocker tray 46. However, it is contemplated and possible that each of the openings 70, 72, 74, 76 may include any shape, size, and/or length that is operable to allow the pin 42 to extend therethrough.

The spring seat element 50 is generally annular in shape and includes a hole through which the pin 42 extends. In one example, the element 50 is made of a rubber-like material, and functions as a bumper as the rake assembly is moved between upper and lower rake limits. When the rake assembly 28 is assembled, the spring seat element 50 is located in the opening 72 of the support structure 22, and moves vertically within the opening 72 along with the pin 42 during rake adjustment.

Referring to FIGS. 1, 8, and 10-11, the inner tray 44 is rigidly fixed to the support structure 22, and includes an outer surface 78 that defines, or carries, at least one set of teeth 80. The inner tray 44 may be formed separately from the support structure 22 and fixed thereto such as, for example, by fastening, welding, adhesive, or the like. The support structure 22 may be formed by stamping, and the inner tray 44 may be formed by, for example, casting, stamping, metallic powder, additive manufacturing, machining, or the like. However, it is contemplated and possible that the inner tray 44 may be formed with the support structure 22, such as by casting, so that the support structure 22 and the inner tray 44 form a cast support structure.

The at least one set of teeth 80 may include a first set of teeth 80A and a second set of teeth 80B. Each tooth of the sets of teeth 80A, 80B may be aligned laterally with the next adjacent tooth and extend longitudinally with respect to axis 34. Each tooth 80A, 80B may be a tetrahedral tooth with a point apex 82 located nearest to the opening 74. However, it is contemplated and possible that each tooth 80A, 80B may include any shape operable for engaging the other sets of teeth 80A, 80B. The inner tray 44 may be formed with, or into, the support structure 22 as one unitary part or may be formed separately and coupled thereto. In some embodiments, the inner tray 44 may include only one set of teeth.

Figure 6:
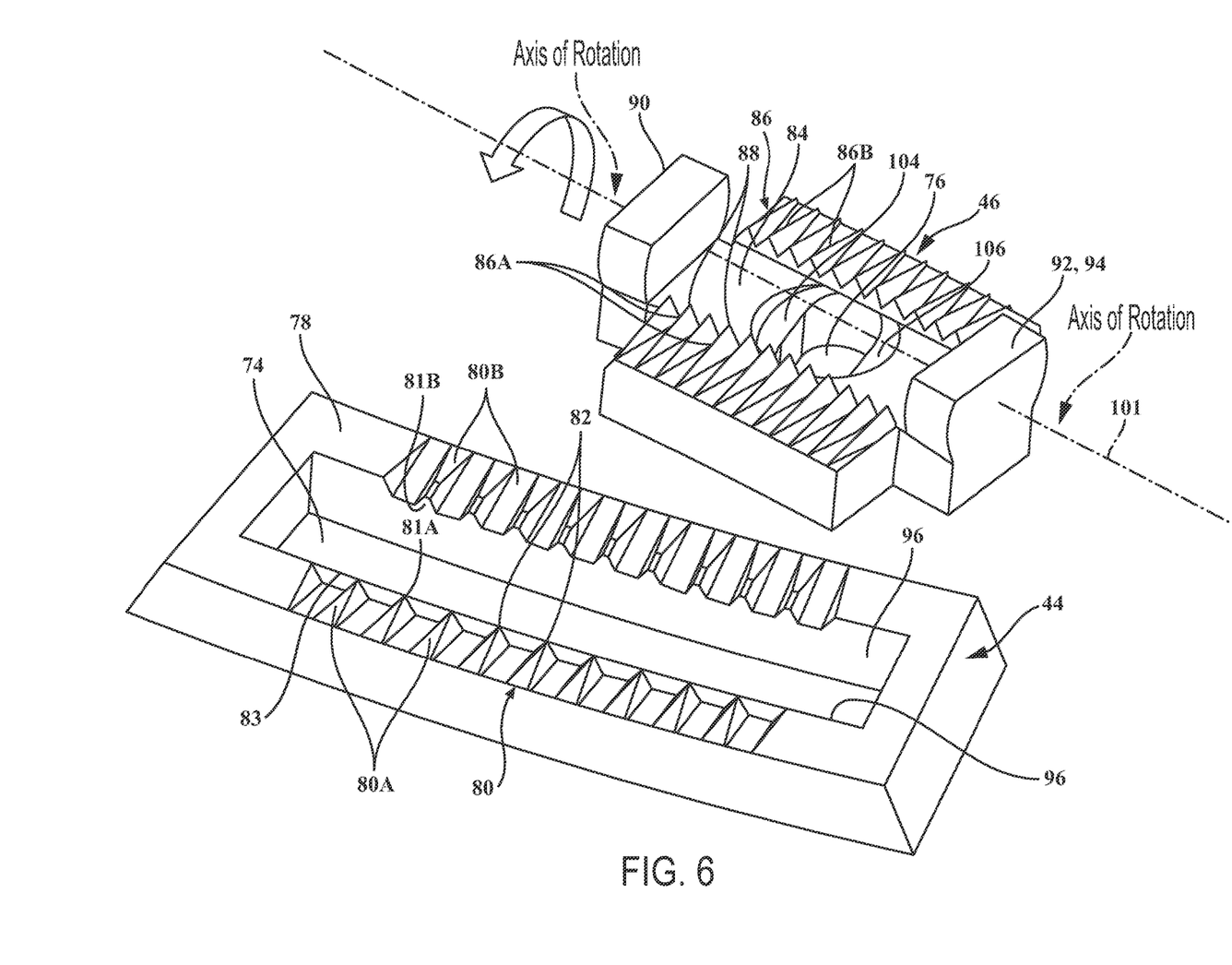
FIG. 6 is a perspective view of an inner tray and a rocker tray of the rake adjustment assembly, according to one or more embodiments shown and described herein.
Figure 7:
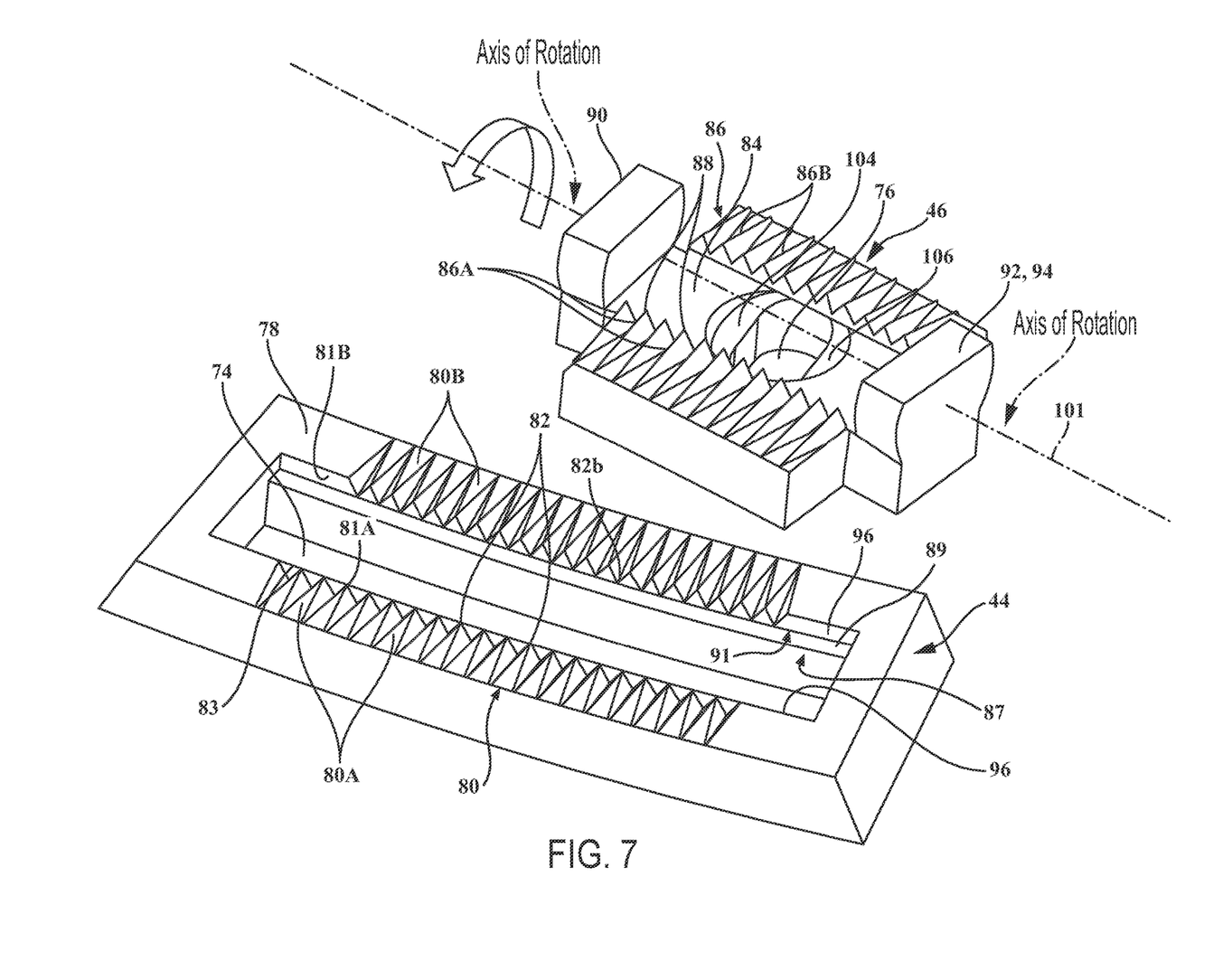
FIG. 7 is a perspective view of another inner tray and another rocker tray of the rake adjustment assembly, according to one or more embodiments shown and described herein.

Referring to FIGS. 6 and 7, the second set of teeth 80B is spaced apart from the first set of teeth 80A with the opening 74 positioned therebetween. The first set of teeth 80A includes an inner edge 81A extending along a length of the first set of teeth 80A and positioned between the first set of teeth 80A and the second set of teeth 80B. The inner tray 44 includes a wall 83 extending from the outer surface 78 at least partially along the length of the first set of teeth 80A. The wall 83 may contact and be positioned along the inner edge 81A of the first set of teeth 80A. The wall 83 may extend a height from the outer surface 78 that is equal to a height of the point apex 82 of the first set of teeth 80A. However, the height of the wall 83 may be less than or greater than the height of the point apex 82 of the first set of teeth 80A. As will be described in greater detail below, the wall 83 is positioned between the first set of teeth 80A and the opening 74 to prevent the rocker tray 46 from misaligning with the first set of teeth 80A.

The second set of teeth 80B includes an inner edge 81B extending along a length of the second set of teeth 80B and positioned between the second set of teeth 80B and the first set of teeth 80A. The second set of teeth 80B additionally includes features that prevent the rocker tray 46 from misaligning with the second set of teeth 80B. In some embodiments and with reference to FIG. 6, the second set of teeth 80B are chamfered at the inner edge 81B to avoid contact with a leg 92, which will be described in greater detail below. The chamfer reduces a height of the second set of teeth 80B along the inner edge 81B, and may flatten each tooth 80B to remove the apex 82 and reduce the height of the teeth 80B. The second set of teeth 80B may be chamfered at any operable angle for reducing the height of the second set of teeth 80B at the inner edge 81B such as, for example, between 5° and 15° from the outer surface 78. However, it is contemplated and possible that the second set of teeth 80B are chamfered at an angle between 5° and 35° from the outer surface 78, or more specifically, 5° from the outer surface 78, 10° from the outer surface 78, 15° from the outer surface 78, or the like.

In other embodiments and with reference to FIG. 7, the inner tray 44 includes extension 87 positioned at the inner edge 81B of the second set of teeth 80B that extends from the inner edge 81B into the opening 74 and at least partially along the length of the second set of teeth 80B. The extension 87 includes an upper surface 89 that is spaced apart from the outer surface 78 to define a step 91. The upper surface 89 may be spaced apart from the outer surface 78 a distance such that a bottom 82*b* of each tooth of the second set of teeth 80B contacts the upper surface 89. The upper surface 89 may extend in parallel with the outer surface 78. The step 91 is positioned at the opening 74 adjacent the second set of teeth 80B to space the inner edge 81B of the second set of teeth 80B from the opening 74. While the chamfer and the step 91 are depicted separately in FIGS. 6 and 7, it is contemplated and possible that the inner tray 44 may include both the step 91 and chamfer.

Figure 4:
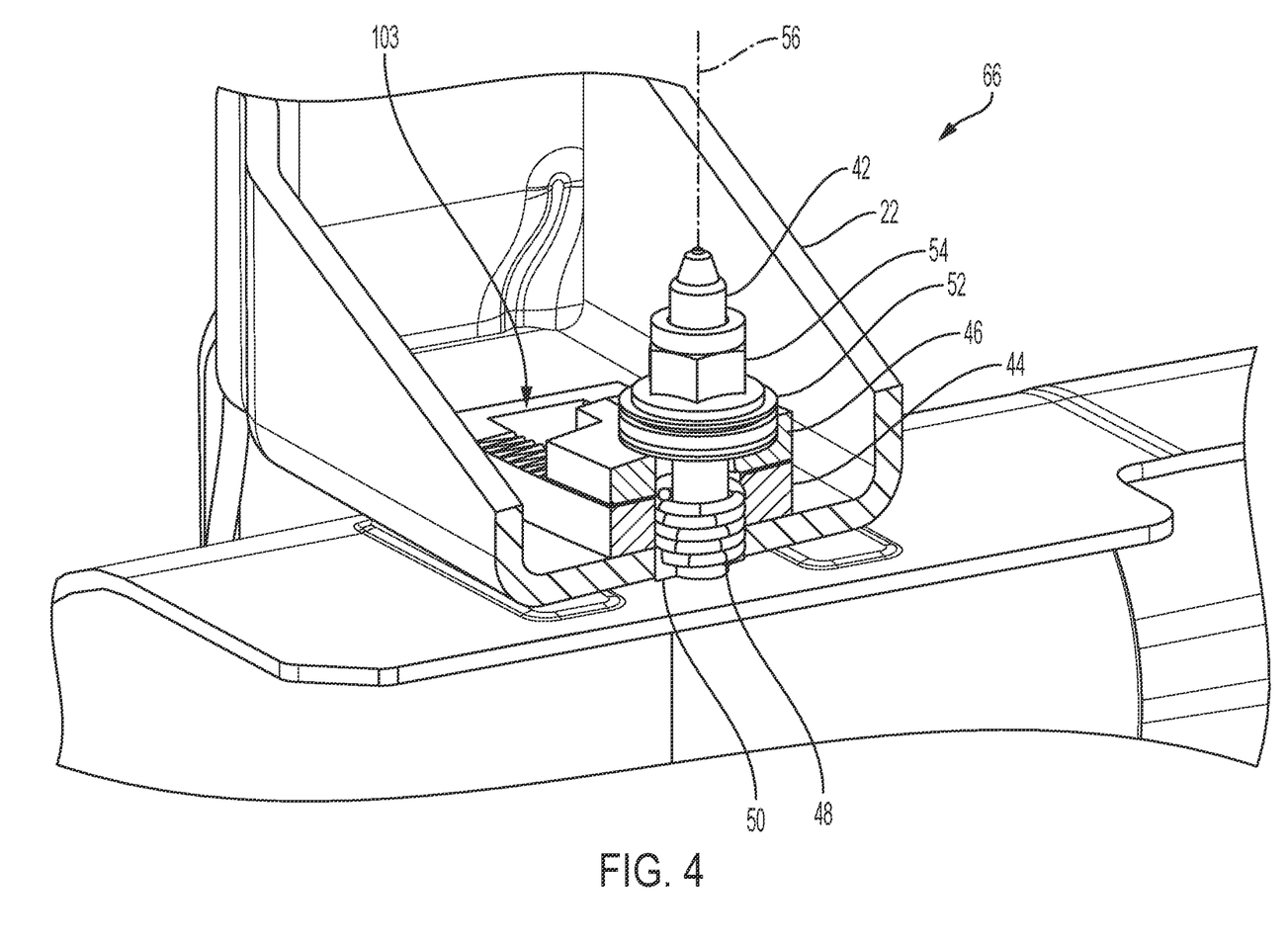
FIG. 4 is a partial, perspective, cross section of the rake adjustment assembly in the locked position, according to one or more embodiments shown and described herein.
Figure 5:
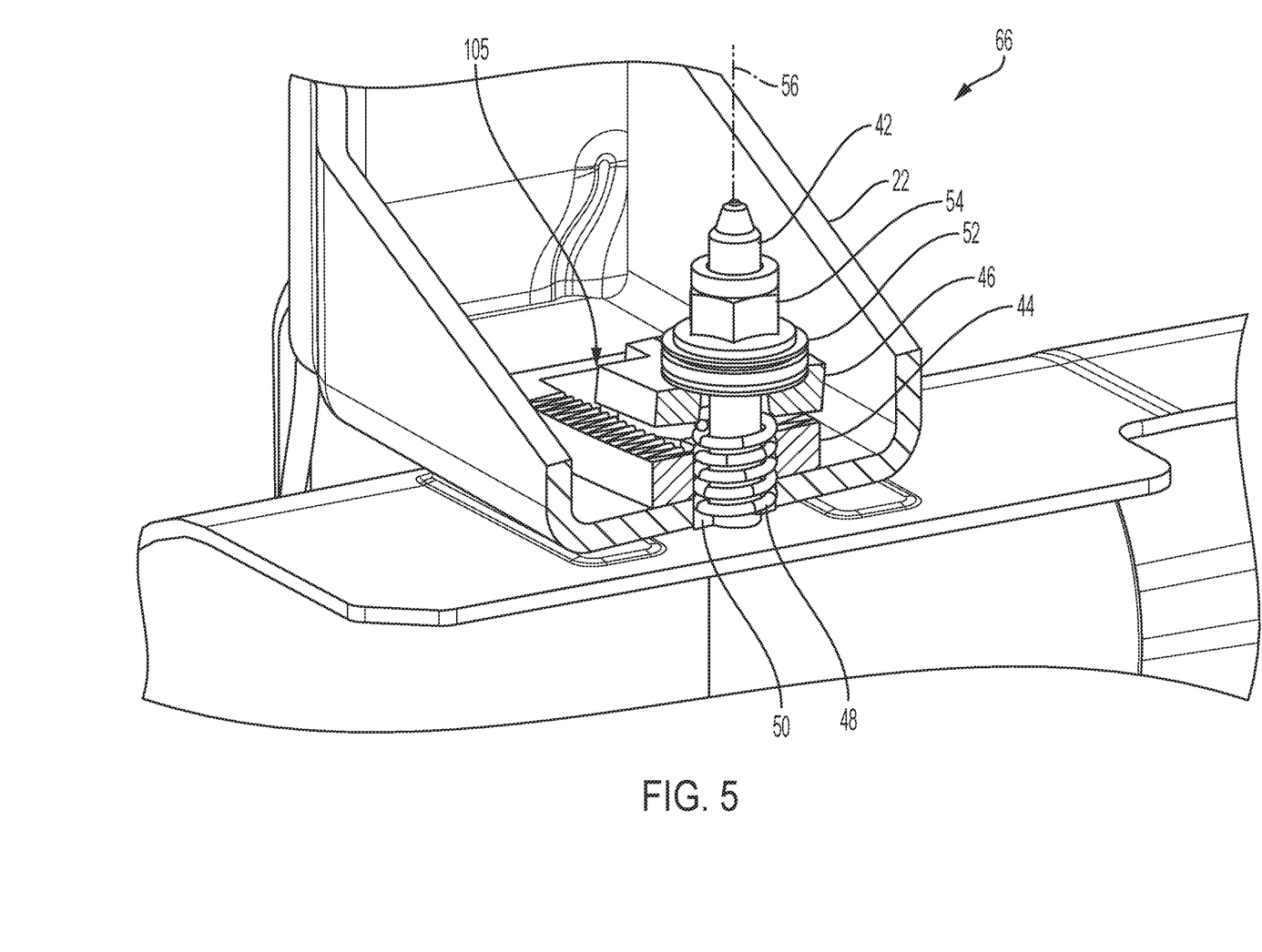
FIG. 5 is a partial, perspective, cross section of the rake adjustment assembly in the unlocked position, according to one or more embodiments shown and described herein.
Figure 10:
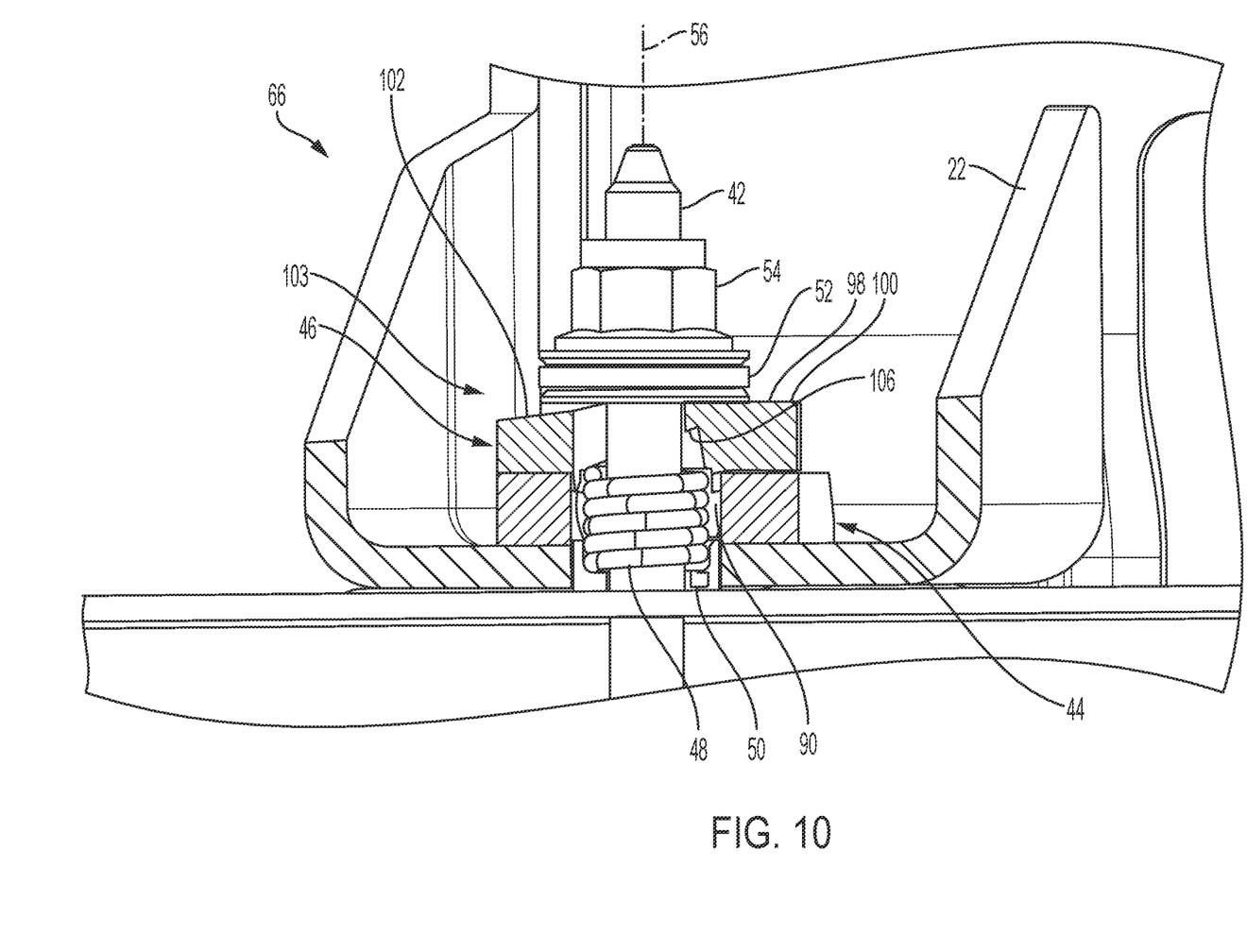
FIG. 10 is a partial, orthographic, cross section of the rake adjustment assembly in the locked position, according to one or more embodiments shown and described herein.

Referring to each of FIGS. 6 and 7, the rocker tray 46 includes an inner surface 84 that opposes the outer surface 78 of the inner tray 44. The inner surface 84 defines, or carries, at least one set of teeth 86 configured to mesh with the sets of teeth 80 of the inner tray 44. The at least one set of teeth 86 may include a first set of teeth 86A and a second set of teeth 86B. Each tooth 86A, 86B is aligned laterally with the next adjacent tooth and extends longitudinally with respect to axis 34. In one example, each tooth 86A, 86B may be a tetrahedral tooth with a point apex 88 located nearest to the opening 76. When the rake assembly 28 is in the locked position 66, such as shown in FIGS. 2, 4, and 10, the sets of teeth 80A, 80B are firmly meshed with the respective sets of teeth 86A, 86B. In another embodiment, and like the inner tray 44, the rocker tray 46 may include only one set of teeth.

Referring to FIG. 6, each set of teeth 86A, 86B of the rocker tray 46 may include a number of teeth such that when the sets of teeth 86A, 86B of the rocker tray 46 with the sets of teeth 80A, 80B of the inner tray 44, the sets of teeth 86A, 86B of the rocker tray 46 mesh with the sets of teeth 80A, 80B of the inner tray 44 in a 2:1 ratio. In other words, the sets of teeth 86A, 86B of the rocker tray 46 mesh with the sets of teeth 80A, 80B of the inner tray 44 such that two teeth of the sets of teeth 86A, 86B of the rocker tray 46 are positioned between each adjacent pair of teeth of the sets of teeth 80A, 80B of the inner tray 44. However, with reference to FIG. 7, it is contemplated and possible that the sets of teeth 86A, 86B may include a number of teeth such that when the sets of teeth 86A, 86B of the rocker tray 46 with the sets of teeth 80A, 80B of the inner tray 44, the sets of teeth 86A, 86B of the rocker tray 46 mesh with the sets of teeth 80A, 80B of the inner tray 44 in a 1:1 ratio.

The rocker tray 46 of the rocker assembly 28 may include at least one leg, such as two legs illustrated in FIGS. 6 and 7 as 90, 92, that project outward from the inner surface 84, are spaced diametrically from one-another with respect to axis 56, and project axially with respect to axis 56. When the rake assembly 28 is assembled, the legs 90, 92 project into the opening 74 of the inner tray 44 to maintain alignment of the trays 44, 46 (also see FIGS. 2 and 3). Each leg 90, 92 carries diametrically opposing, convex faces 94 that facilitates rocking of the rocker tray 46 without interference from opposing sidewalls 96 of the inner tray 44 that, in-part, define the opening 74. In another embodiment, the sidewalls 96 may be carried by the support structure 22.

Referring still to FIGS. 6 and 7, the rocker tray 46 further includes an outer surface 98 that substantially faces in an opposite direction to the inner surface 84, and with respect to axis 56. Where the surfaces 78, 84 of the respective inner and rocker trays 44, 46 are generally planar and normal to axis 56, the outer surface 98 of the rocker tray 46 is convex. More specifically, the outer surface 98 is bisected along a line 99 (see FIG. 2) that is substantially normal to the longitudinal lengths of the teeth 86A, 86B, and normal to axis 56. On one side of the line, the outer surface 98 includes a first segment 100 that is substantially planar and normal to axis 56, and on the other side of the line, the outer surface 98 includes a second segment 102 that is angled with respect to axis 56 to facilitate the rocking motion of the rocker tray 46 about a rocker axis 101 (i.e., floating axis) as the rake assembly 28 moves from the locked position 66 (see FIGS. 2, 4, and 10) to the unlocked position 68 (see FIGS. 3, 5, and 11).

The rocker axis 101 may be transverse to the axis 56. However, it is contemplated and possible that the rocker axis 101 may be normal to axis 56 and normal to axis 34. The rocker axis 101 may be further normal to the longitudinal lengths of the elongated teeth 80A, 80B, 86A, 86B. During operation of the rake assembly 28, the rocker tray 46 is in an un-tilted state 103 (see FIGS. 2, 4, and 10) when in the locked position 66, and is in a tilted state 105 (see FIGS. 3, 5, and 11) when in the unlocked position 68.

Figure 8:
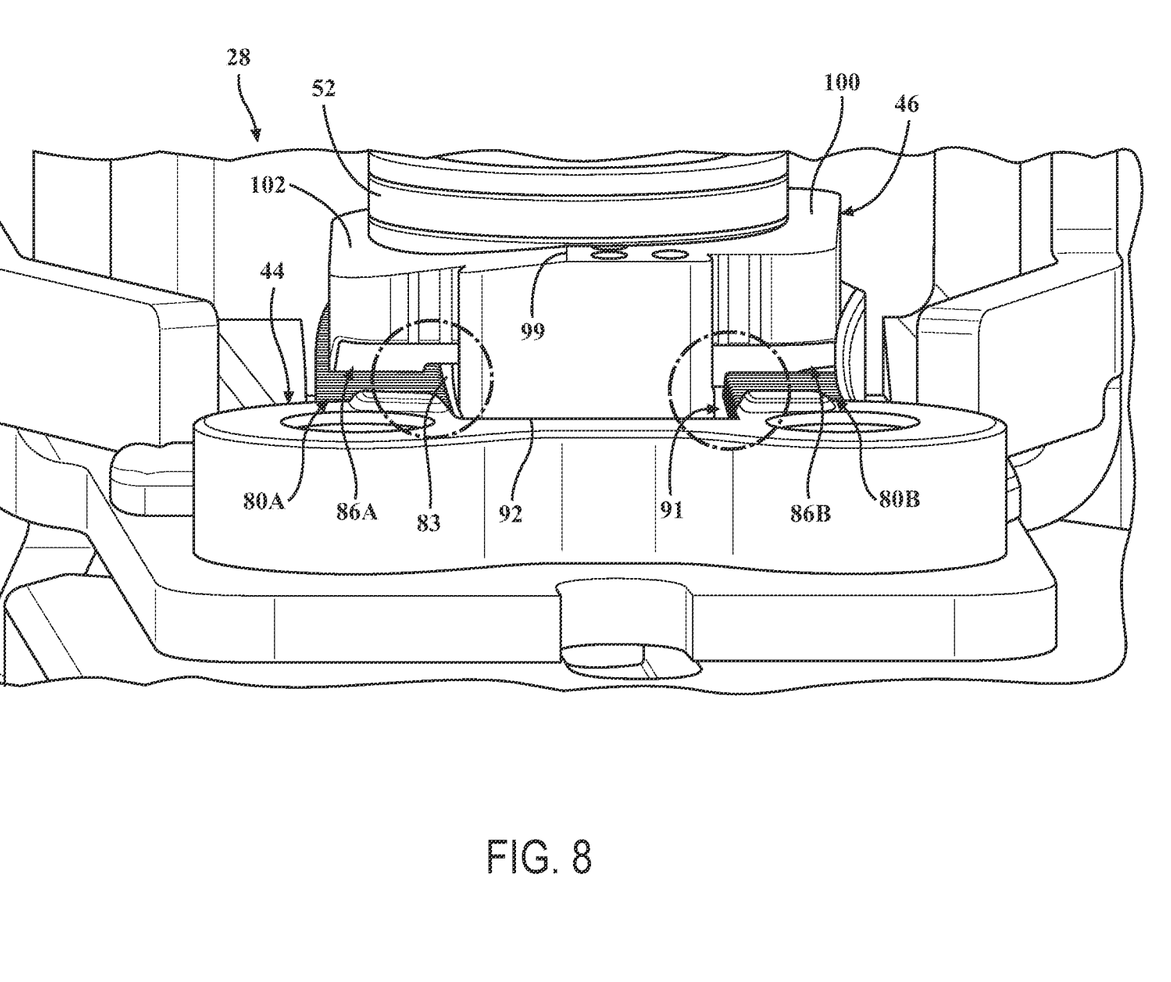
FIG. 8 is a partial perspective view of rake adjustment assembly in the locked position, according to one or more embodiments shown and described herein.
Figure 8A:
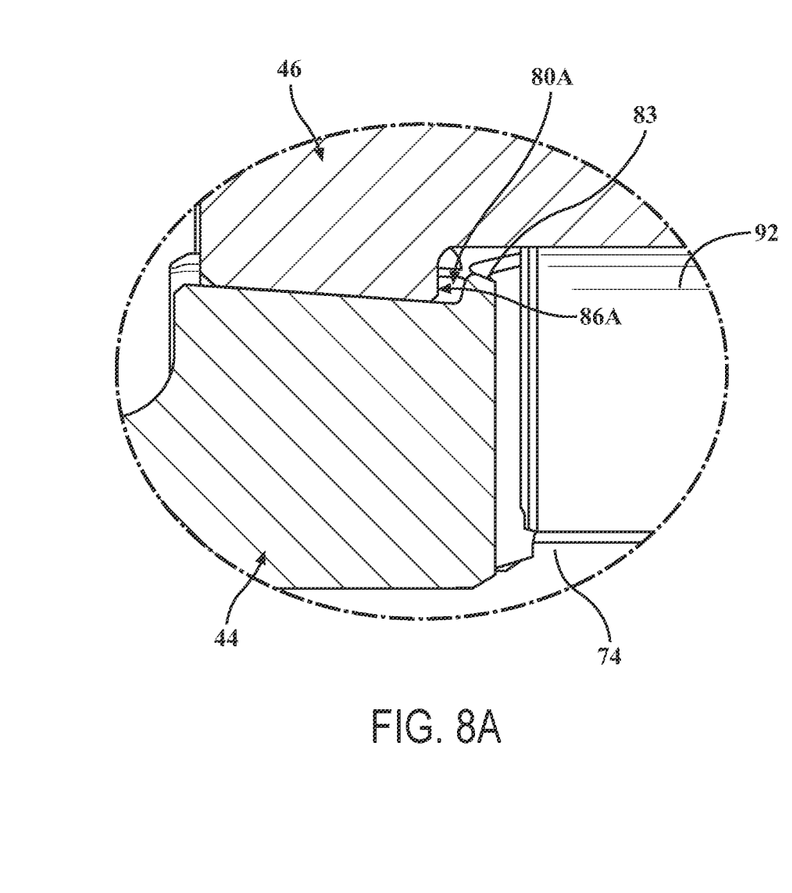
FIG. 8A is a partial perspective view of a first set of teeth of the inner tray engaging a first set of teeth of the rocker tray in the locked position, according to one or more embodiments shown and described herein.
Figure 8B:
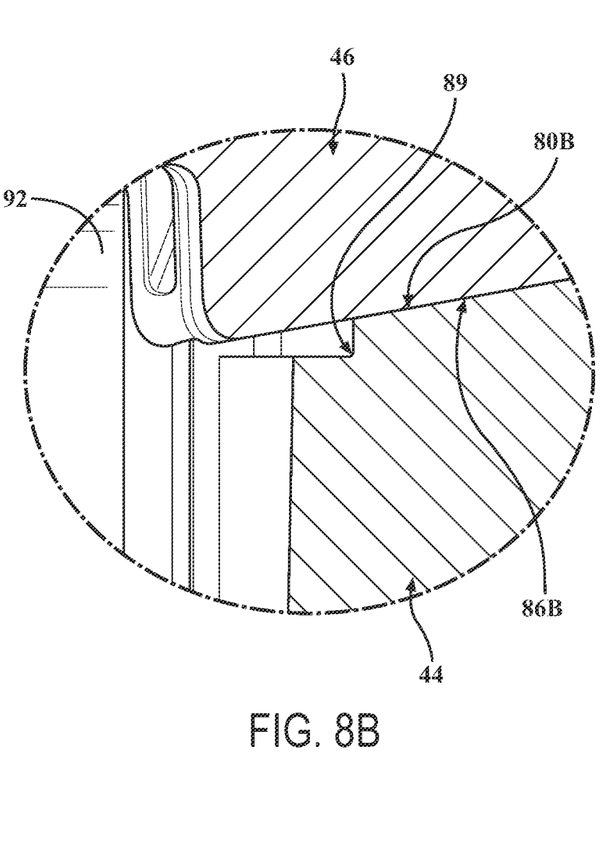
FIG. 8B is a partial perspective view of a second set of teeth of the inner tray engaging a second set of teeth of the rocker tray in the locked position, according to one or more embodiments shown and described herein.

Referring to FIGS. 8, 8A, and 8B, the rake adjustment assembly 28 is depicted in the locked position 66, with the teeth 86A, 86B of the rocker tray 46 engaged with the teeth 80A, 80B of the inner tray 44. As shown in FIGS. 8 and 8A, the wall 83 of the inner tray 44 is positioned between the teeth 86A and the legs 90, 92 of the rocker tray 46. The wall 83 is positioned to prevent the teeth 86A of the rocker tray 46 from scraping against the teeth 80A of the inner tray 44 when moving between the locked position 66 and the unlocked position 68, and when the rocker tray 46 moves along axis 101. As shown in FIGS. 8 and 8B, the step 89 spaces the apex 88 of the teeth 86B of the rocker tray 46 from the apex 82 of the teeth 80B of the inner tray 44 to prevent the teeth 86B of the rocker tray 46 from scraping against the teeth 80B of the inner tray 44 when moving between the locked position 66 and the unlocked position 68, and when the rocker tray 46 moves along axis 101. The chamfers work similarly to the step 89 to prevent scraping between the teeth 80B, 86B.

Figure 9:
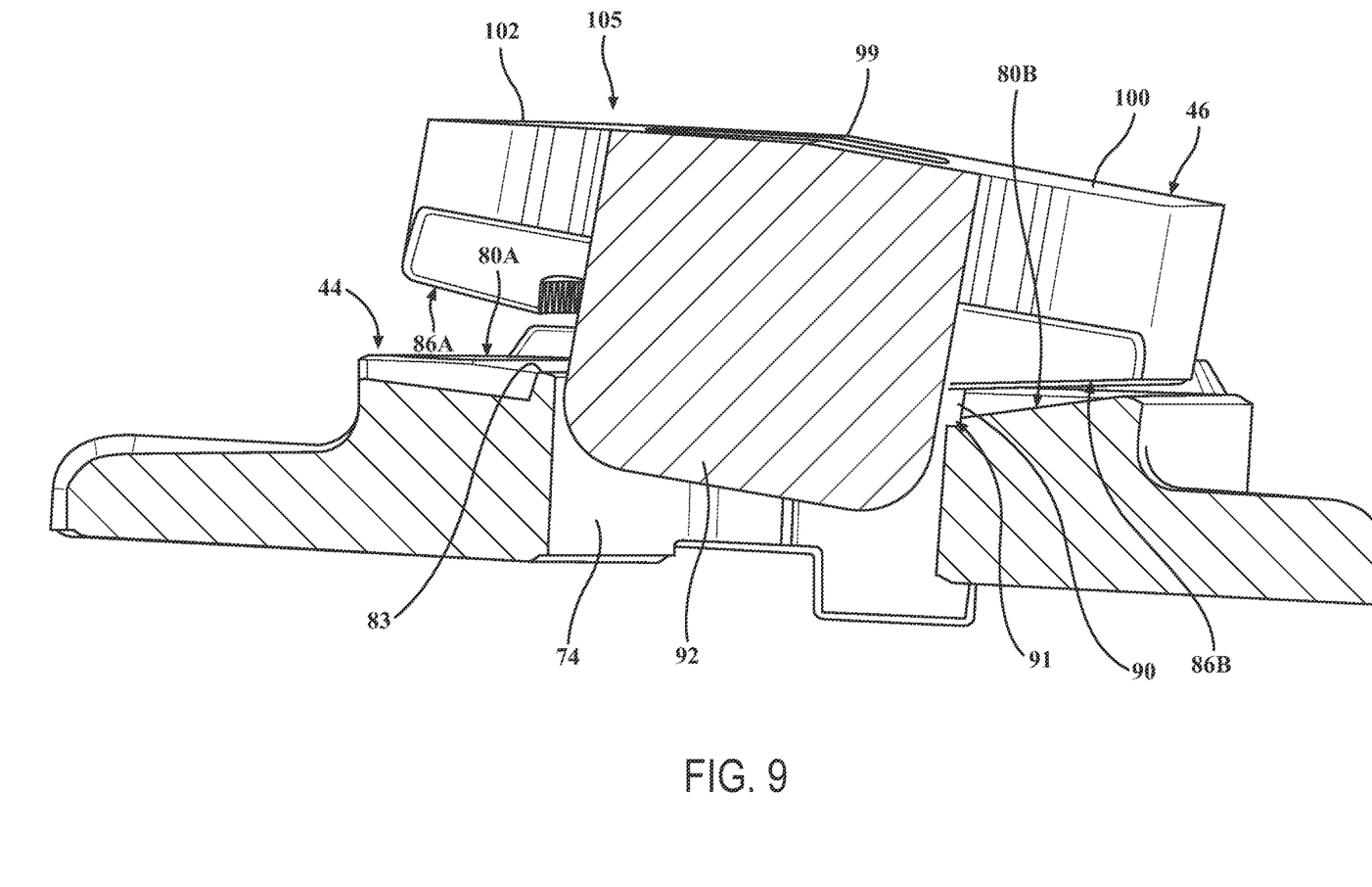
FIG. 9 is a perspective view of the inner tray and the rocker tray in the unlocked position, according to one or more embodiments shown and described herein.

Referring to FIG. 9, the rocker tray 46 is shown in the tilted state 105 and unlocked position 68. In the tilted state 105, the legs 90, 92 is angled within the opening 74 of the inner tray 44 so that the first set of teeth 86A of the rocker tray 46 are spaced further apart from the first set of teeth 80A of the inner tray 44 than the space between second the set of teeth 86B of the rocker tray 46 and the second set of teeth 80B of the inner tray 44. The first set of teeth 86A of the rocker tray 46 is positioned at a distance away from the first set of teeth 80A of the inner tray 44 so that the first set of teeth 86A of the rocker tray 46 is spaced apart from the wall 83. When moving from the tilted state 105 to the un-tilted state 103 (FIG. 2), the wall 83 prevents the first set of teeth 86A of the rocker tray 46 from engaging the inner edge 81A of the first set of teeth 80A of the inner tray 44, thereby preventing the sets of teeth 80A, 86A from grinding and misaligning during both rotation of the rocker tray 46 and movement of the rocker tray 46 along axis 101. The step 91 and chamfers similarly space the second set of teeth 86B of the rocker tray 46 from the second set of teeth 80B of the inner tray 44 to prevent the second set of teeth 86B of the rocker tray 46 from engaging the inner edge 81B of the second set of teeth 80B of the inner tray 44, thereby preventing the sets of teeth 80B, 86B from grinding and misaligning during both rotation of the rocker tray 46 and movement of the rocker tray 46 along axis 101.

Figure 11:
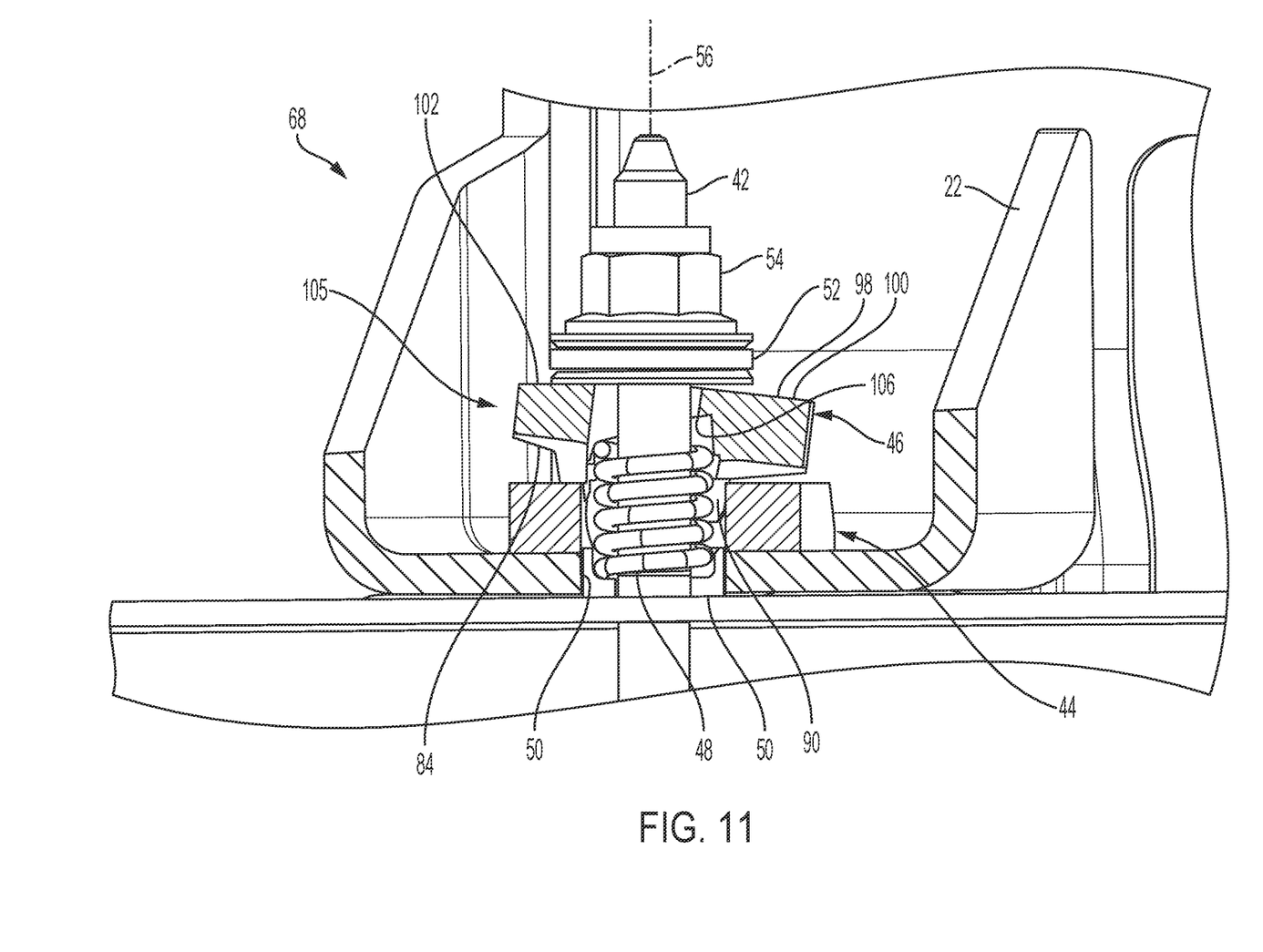
FIG. 11 is a partial, orthographic, cross section of the rake adjustment assembly in the unlocked position, according to one or more embodiments shown and described herein.

Referring to FIGS. 10 and 11, the spring 48 may be a coiled spring and is axially compressed when the rake assembly 28 is in the locked position 66, and is axially less compressed when the rake assembly 28 is in the unlocked position 68. At one end, the spring 48 is seated axially against the element 50 and at an opposite end, the spring 48 is seated against the rocker tray 46. More specifically and as best shown in FIGS. 6 and 7, the rocker tray 46 may define a counter bore 104 having bottom face 106 through which the opening 76 communicates. The bottom face 106 may lie with an imaginary plane that is substantially parallel to the segment 102 of the outer surface 98. The spring 48 exerts a force against, and is in biased contact with, the bottom face 106. Because the bottom face 106 (i.e., spring seat face) is not normal with the axis 56, the rocker tray 46 tilts as the rake assembly is moved from the locked position 66 to the unlocked position 68.

During operation of the rake assembly 28, and as the assembly moves from the unlocked position 68 and toward the locked position 66, the rocker tray 46 is tilted with respect to the inner tray 44 such that the set of teeth 86A of the rocker tray 46 are axially closer to the set of teeth 80A of the inner tray 44, than the set of teeth 86B are to the set of teeth 80B. With continued locking motion, the rocker tray 46 axially moves closer to the inner tray 44 until the point apex 88 of each tooth 86A is located between point apexes 82 of adjacent teeth 80A. If the inner teeth part and outer teeth part tooth peaks hit one another then the outer teeth part's floating axis allows the outer part to rotate about the floating axis, creating an additional motion that helps the outer teeth to move off or from the "peak to peak" tooth position and into a fully nested position with the inner teeth.

As discussed above, the wall 83, chamfers, and step 91 prevent the teeth 86A, 86B from engaging the inner edges 81A, 81B of the teeth 80A, 80B to position the teeth 80A, 80B, 86A, 86B to nest and mesh with one another.

With this inherent, or automatic, alignment of teeth 86A with teeth 80A, the alignment of teeth 86B with teeth 80B is pre-disposed. That is, teeth 86A and teeth 80A mesh first because the rocker tray 46 is tilted, but with continued locking motion, the rocker tray 46 begins to un-tilt and the pre-aligned teeth 86B, 80B mesh together without any interference. It is further contemplated and understood that teeth 86B, 80B may not have point apexes since alignment of these teeth is not at issue.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

What is claimed is:

1. A rake assembly for a steering column comprising:
a pin adapted to move along a first axis between a locked position and an unlocked position;
a first tray fixed to a support structure, the first tray comprising an exterior surface and an extension, at least one set of teeth defined on the exterior surface, the extension extending from an edge of the set of teeth formed in the exterior surface and at least partially along a length of the set of teeth, the extension comprising an upper surface spaced apart from the exterior surface to define a step; and
a rocker tray comprising an inner surface, at least one set of teeth defined on the inner surface and adapted to mesh with the set of teeth of the first tray when in the locked position and un-mesh when in the unlocked position, wherein the at least one set of teeth of the first tray comprises a first set of teeth and a second set of teeth spaced apart from the first set of teeth, the first set of teeth comprising an inner edge between the first set of teeth and the second set of teeth, the second set of teeth comprising an inner edge between the first set of teeth and the second set of teeth, the step is positioned along the inner edge of the second set of teeth.

2. The rake assembly of claim 1, wherein the first tray further comprises a wall extending from the exterior surface at least partially along the inner edge of the first set of teeth.

3. The rake assembly of claim 1, wherein the rocker tray is adapted to rock about a second axis from an un-tilted state when in the locked position and to a tilted state when in the unlocked position to provide a degree of motion to facilitate meshing of the set of teeth of the first tray and the set of teeth of the rocker tray, the second axis being transverse to the first axis.

4. The rake assembly of claim 1, wherein the at least one set of teeth of the rocker tray mesh with the at least one set of teeth of the first tray in a 2:1 ratio such that two teeth of the set of teeth of the rocker tray are positioned between each adjacent pair of teeth of the set of teeth of the first tray.

5. A rake assembly for a steering column comprising:
a pin adapted to move along a first axis between a locked position and an unlocked position;

a first tray fixed to a support structure, the first tray comprising an exterior surface and an extension, at least one set of teeth defined on the exterior surface, the extension extending from an edge of the set of teeth formed in the exterior surface and at least partially along a length of the set of teeth, the extension comprising an upper surface spaced apart from the exterior surface to define a step; and a rocker tray comprising an inner surface, at least one set of teeth defined on the inner surface and adapted to mesh with the set of teeth of the first tray when in the locked position and un-mesh when in the unlocked position, wherein the rocker tray further comprises an outer surface defined by a first segment and a second segment, wherein the first segment and the second segment are planar segments oriented at a non-parallel angle relative to each other.

6. The rake assembly of claim 5, wherein the plurality of teeth of the first tray are located on an outer surface of the first tray, wherein the outer surface of the first tray, the inner surface of the rocker tray, and the first segment of the outer surface of the rocker tray are oriented parallel to each other.

7. The rake assembly of claim 5, wherein the inner surface of the rocker tray defines a counter bore having a face that is angled relative to the first segment of the outer surface.

8. The rake assembly of claim 7, wherein the face of the counter bore is oriented parallel relative to the second segment of the outer surface of the rocker tray.

9. The rake assembly of claim 8, further comprising a spring seat element disposed within the first opening, the spring in contact with the spring seat element at a first end of the spring and in contact with the rocker tray at a second end of the spring.

10. The rake assembly of claim 7, wherein a spring is in contact with the face of the counter bore to bias the rake assembly toward the unlocked position.

11. A rake assembly for a steering column comprising:
a pin adapted to move along a first axis between a locked position and an unlocked position;
a first tray fixed to a support structure, the first tray comprising an exterior surface and an extension, at least one set of teeth defined on the exterior surface, the extension extending from an edge of the set of teeth formed in the exterior surface and at least partially along a length of the set of teeth, the extension comprising an upper surface spaced apart from the exterior surface to define a step;
a rocker tray comprising an inner surface, at least one set of teeth defined on the inner surface and adapted to mesh with the set of teeth of the first tray when in the locked position and un-mesh when in the unlocked position;
a spring in contact with the rocker tray and adapted to bias the rake assembly toward the unlocked position;
a first opening defined by the support structure;
a second opening defined by the first tray; and
a third opening defined by the rocker tray, wherein the spring is at least partially disposed within the first opening and the second opening.

12. A rake assembly for a steering column comprising:
a first tray comprising an exterior surface and an extension, a first set of teeth and a second set of teeth spaced apart from the first set of teeth each defined on the exterior surface, the extension extending from an inner edge of the second set of teeth between the first set of teeth and the second set of teeth and at least partially along a length of the second set of teeth, the extension comprising an upper surface spaced apart from the exterior surface to define a step; and a rocker tray comprising an inner surface, a first set of teeth and a second set of teeth defined on the inner surface and adapted to mesh with the first set of teeth and the second set of teeth of the first tray.

13. The rake assembly of claim 12, wherein the first tray further comprises a wall extending from the exterior surface at least partially along the inner edge of the first set of teeth.

14. The rake assembly of claim 12, further comprising a pin adapted to move along a first axis between a locked position and an unlocked position, the first and second set of teeth of the rocker tray are adapted to mesh with the first and second set of teeth of the first tray when in the locked position and un-mesh when in the unlocked position, the rocker tray is adapted to rock about a second axis from an un-tilted state when in the locked position and to a tilted state when in the unlocked position to provide a degree of motion to facilitate meshing of the set of teeth of the first tray and the set of teeth of the rocker tray, the second axis being transverse to the first axis.

15. The rake assembly of claim 14, further comprising:
a spring in contact with the rocker tray and adapted to bias the rake assembly toward the unlocked position;
a first opening defined by the support structure;
a second opening defined by the first tray; and
a third opening defined by the rocker tray, wherein the spring is at least partially disposed within the first opening and the second opening.

16. The rake assembly of claim 15, further comprising a spring seat element disposed within the first opening, the spring in contact with the spring seat element at a first end of the spring and in contact with the rocker tray at a second end of the spring.

17. The rake assembly of claim 12, wherein the rocker tray further comprises an outer surface defined by a first segment and a second segment, wherein the first segment and the second segment are planar segments oriented at a non-parallel angle relative to each other.

18. A steering column assembly comprising:
a jacket pivotable about a rake axis;
a pin having a lever operatively coupled to a first end of the pin, the pin moveable along a first axis between a locked position and an unlocked position;
a support structure operatively coupled to the jacket;
a first tray fixed to the support structure, the first tray comprising an exterior surface and an extension, at least one set of teeth defined on the exterior surface, the extension extending from an edge of the set of teeth and at least partially along a length of the set of teeth, the extension comprising an upper surface spaced apart from the exterior surface to define a step; and
a rocker tray comprising an inner surface, and at least one set of teeth defined on the inner surface and adapted to mesh with the set of teeth of the first tray when in the locked position and un-mesh when in the unlocked position, the rocker tray being adapted to rock about a second axis from an un-tilted state when in the locked position and to a tilted state when in the unlocked position to provide a degree of motion to facilitate meshing of the plurality of teeth of the first tray and the plurality of teeth of the rocker tray.

19. The steering column assembly of claim 18, wherein the at least one set of teeth of the first tray comprises a first set of teeth and a second set of teeth spaced apart from the first set of teeth, the first set of teeth comprising an inner edge between the first set of teeth and the second set of teeth, the second set of teeth comprising an inner edge between the first set of teeth and the second set of teeth, the step is positioned along the inner edge of the second set of teeth, and first tray further comprises a wall extending from the exterior surface at least partially along the inner edge of the first set of teeth.

\* \* \* \* \*